B. B. TURNER & C. G. POLLOCK.
GRAIN CUTTING DEVICE.
APPLICATION FILED JUNE 26, 1908.
962,601.
Patented June 28, 1910.
3 SHEETS—SHEET 3.
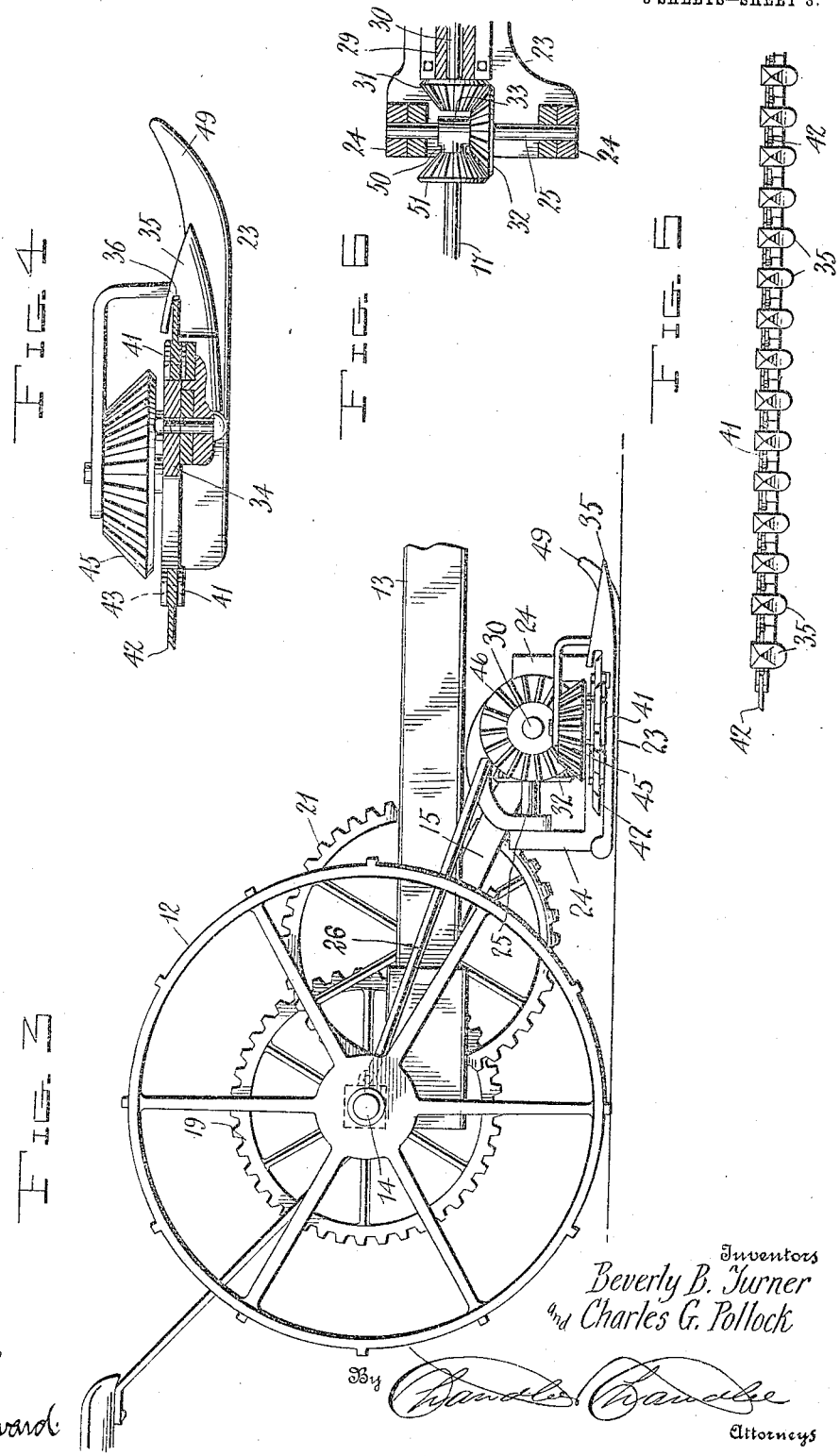
Witnesses
Inventors
Beverly B. Turner
and Charles G. Pollock
By
Attorneys

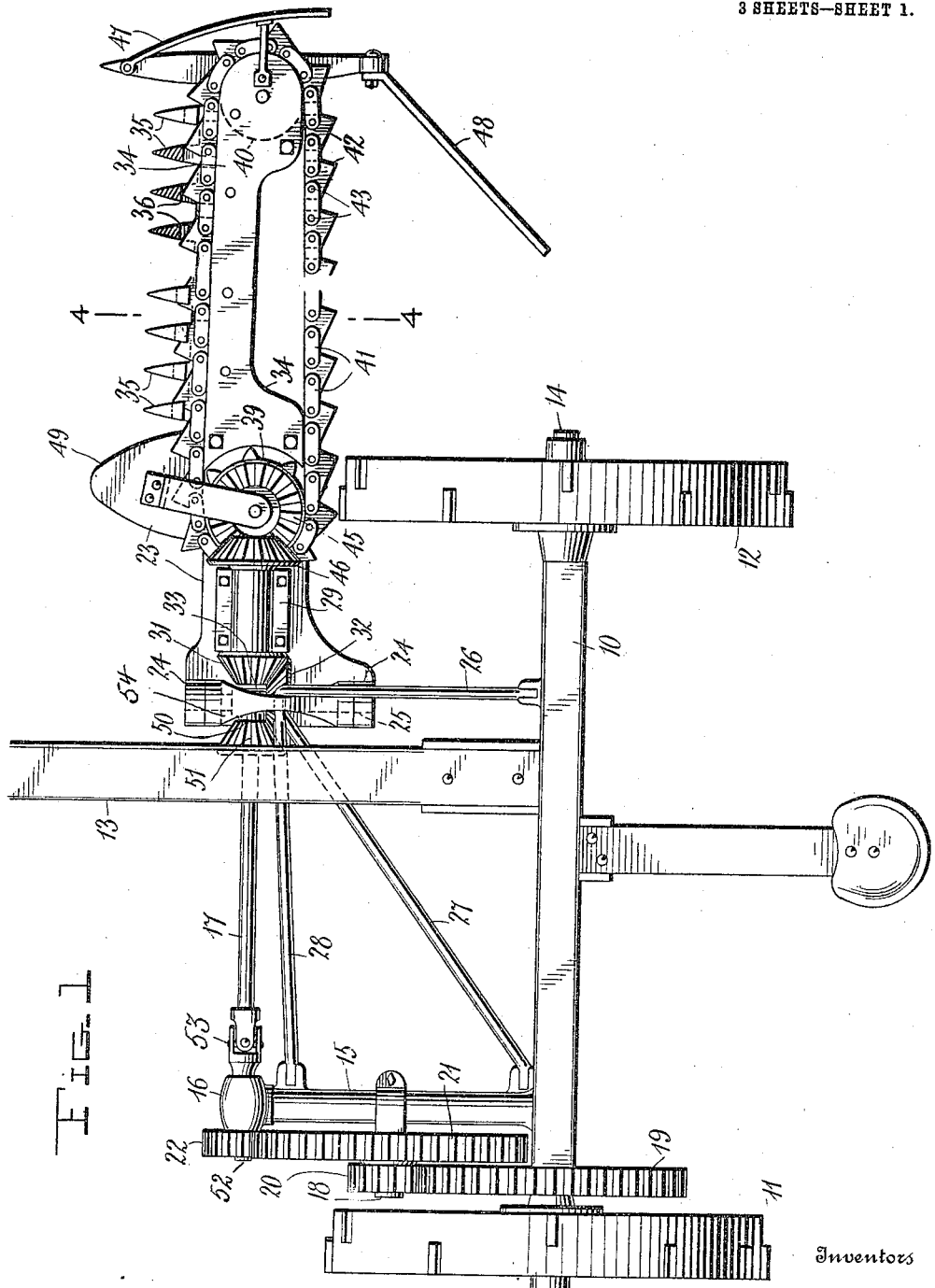

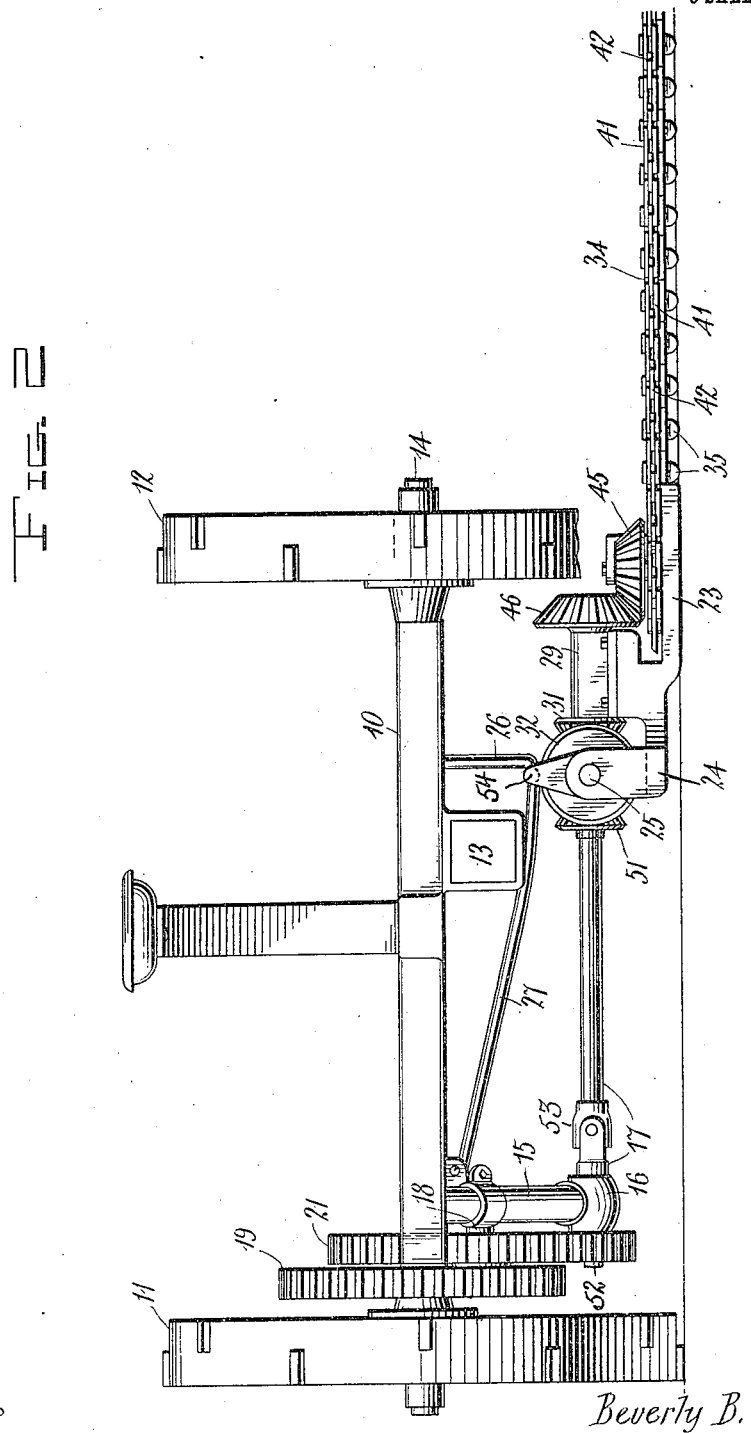

UNITED STATES PATENT OFFICE.

BEVERLY B. TURNER AND CHARLES G. POLLOCK, OF BERTHOUD, COLORADO.

GRAIN-CUTTING DEVICE.

962,601.  Specification of Letters Patent.  Patented June 28, 1910.

Application filed June 26, 1908. Serial No. 440,499.

*To all whom it may concern:*

Be it known that we, BEVERLY B. TURNER and CHARLES G. POLLOCK, citizens of the United States, residing at Berthoud, in the county of Larimer, State of Colorado, have invented certain new and useful Improvements in Grain-Cutting Devices; and we do hereby declare the following to be a full, clear, and exact description of the invention, such as will enable others skilled in the art to which it appertains to make and use the same.

This invention relates to mowing machines and similar devices, and has for one of its objects to simplify and improve the grain cutting elements of machines of this character, and increase their efficiency, durability and utility.

Another object of the invention is to provide a machine of this character having the cutting elements moving continuously in one direction, and thus avoid the objectionable vibratory movement employed in the ordinary mowing machines.

With these and other objects in view the invention consists in a supporting frame having ground wheels connected therewith and carrying a tilting frame upon which an endless belt of cutting knives is arranged and operative from the ground wheels whereby the cutting action is continuous in one direction only and the cutter carrying frame adapted to be elevated into a perpendicular position when the machine is not in use or when traveling from place to place, the elevation of the cutter carrying frame also permitting the elevation of the same to avoid obstructions in the field.

The invention further consists in a novel means for mounting and arranging the cutting elements.

The invention further consists in a novel arrangement of the endless belt of cutting elements.

The invention further consists in various novel features of construction which will appear in the accompanying specification and be specifically pointed out in the claim, and in the drawings illustrating the preferred embodiment of the invention, Figure 1 is a plan view partly in section. Fig. 2 is a rear elevation. Fig. 3 is an end elevation of the improved apparatus. Fig. 4 is a transverse section enlarged on the line 4—4 of Fig. 1. Fig. 5 is a front view of a portion of the cutting mechanism. Fig. 6 is a detail view of a portion of the sickle operating mechanism.

The improved apparatus comprises a supporting frame 10 of approved construction carrying ground wheels 11—12 and with a draft tongue 13 connected to the frame, the ground wheels being connected rigidly to a shaft or axle 14 mounted for rotation in the frame 10. Leading from the frame 10 is a downwardly and forwardly extending bracket member 15 having a bearing 16 at the lower end in which a shaft 17 is mounted for rotation and with a stud 18 secured to the bracket intermediate its ends. Mounted rigidly upon the shaft or axle 14 is a gear 19 engaging a pinion 20 upon the stud 18, and formed integral with the pinion 20 is another gear 21 engaging a pinion 22 upon the stub shaft 17 so that the rotary motion of the shaft or axle 14 produced by the ground wheels 12 is communicated to the shaft 17, the sizes of the gears producing a very rapid motion to the stub shaft, as will be obvious. The stub shaft 17 is connected to another or coupling shaft 52 by a universal coupling 53, the operation of these parts being hereafter explained.

Arranged forwardly of the ground wheels and located normally near the ground is a shoe bracket 23 having spaced standards 24 at one end in which a shaft 25 is mounted for rotation. Swinging upon the shaft 25 between the standards 24 is a yoke frame 54. Connected at one end therein to the yoke frame 54 are a plurality of braces 26—27—28, the brace 26 connected at its outer end to the frame 10, which the braces 27—28 diverge from the yoke frame and are connected respectively at their outer ends to the member 15. By this means the yoke frame is rigidly supported from the supporting frame of the machine.

Mounted upon the shoe bracket 23 is a box or bearing 29 through which a shaft 30 is mounted for rotation. Swinging upon the shaft 25 is a collar 33 having a step 50 to receive the adjacent end of the shaft 52, the latter carrying a bevel gear 51 engaging with a bevel gear 32 upon the shaft 25, the latter in turn engaging with a bevel gear 32 upon the shaft 30. Carried upon the opposite end of the shaft 30 is another bevel gear 46 engaging with a bevel gear 45 upon a vertical stub shaft carried by the shoe bracket 23, the object to be hereafter explained. By this arrangement the shoe bracket 23 with its standards 24 and the shaft 25 and its associated gears is free to swing together with the parts connected therewith upon the shaft 25 as a center, and the motion of the shaft 52 is communicated through the gears 51—32—31 to the shaft 30, and thence through the gears 46—45 to the endless sickle device, as hereafter explained.

Connected rigidly to the shoe bracket 23 and extending beyond the same is a plate 34 equal in length to the cutting devices and adapted to support the same. Connected beneath the plate 34 is a longitudinal plate 55, the plate 55 being of less width than the plate 34, as represented in Fig. 4. Connected at intervals to the plate 34 are fingers 35 with the usual transverse slots 36 and likewise with a transverse rib 56 bearing against the forward edge of the plate 55, and likewise beneath the forward edge of the plate 34.

Mounted for rotation upon the shoe bracket at the inner end of the plate 34 is a sprocket wheel 39, and likewise mounted for rotation at the outer end of the plate 34 is a chain pulley 40, the sprocket wheel and the chain pulley designed to carry an endless belt formed of alternating chain links and sickle knives, the links represented at 41 and the sickle knives at 42, the links and sickle knives being coupled by pivot pins 43. The links of the belt operate through recesses in the fingers 35 of which the transverse ribs 56 form the rear side and are supported thereby, while the sickle knives project into the guide slots 36 of the fingers 35, and as motion is imparted to the sprocket wheels it will be obvious that the sickle knives pass through the fingers continuously in one direction only. By this arrangement it will be obvious that when the machine is drawn forwardly over the ground the motion of the ground wheels will be communicated to the endless belt of sickle knives through the gearing and shafting, and cause the knives of the forward side of the belt to move in one direction through the fingers 35 and return at the rear of the plate 34, the knives while passing through the fingers severing the grain or grass. When the knives are passing along the rear side of the plate 34 they are inoperative, as will be obvious, the ribs 56 forming supports to the sickle device and preventing the rearward pressure imparted by the cutting action from displacing the endless belt of knives.

Extending forwardly of the shoe bracket 23 is a guard element or shoe 49, adapted to bear against the grain or grass in advance of the gear 45 and chain wheel 39, and prevent the grass or grain from clogging the same. A guard 47 is arranged at the outer end of the plate 34 to protect the carrier pulley 40 and the chain of sickle knives where it passes around the pulley, and extending rearwardly from this guard is a divider element 48. Any suitable mechanism may be employed for elevating the free end of the plate 34 and its attachments, but as this mechanism forms no part of the present invention it is not deemed necessary to illustrate it, the construction of such devices being well known.

By this arrangement it will be obvious that a simply constructed and efficient grain or grass cutting device is provided which may be inexpensively constructed, and applied to any of the various forms of mowing machines, harvesters, and the like, without material change in the construction.

While we have shown the improved device applied to a mowing machine frame for the purpose of illustration it will be understood that it is not desired to limit the invention necessarily to mowing machines, and changes may be made in the construction and in the minor details of the mechanism within the scope of the appended claim without departing from the principle of the invention or sacrificing any of its advantages.

What is claimed is:

In a machine of the class described, a supporting frame, ground wheels carried by said frame, a base plate located in advance of said ground wheels and provided with vertical standards at one end, a shaft bearing carried by said base plate, an extension plate connected to said base plate, chain wheels carried by said extension plate, an endless belt arranged for movement around said chain wheels and formed of alternating links and sickle knives, a shaft mounted for oscillation in said standards and provided with an intermediate transverse bearing, a shaft stepped at one end in said intermediate bearing, a shaft mounted for rotation in the bearing of said base plate, means for communicating the motion of said last mentioned shaft to the endless belt of knives, gear wheels carried respectively by said shafts, an idler gear mounted for rotation upon said standard shaft and engaging the gears of said intermediate shaft and the belt operating shaft, means for communicating the motion of said ground wheels to said intermediate shaft, a yoke frame swinging upon said standard shaft, and a plurality of braces connecting said yoke frame and said supporting frame.

In testimony whereof, we affix our signatures, in presence of two witnesses.

BEVERLY B. TURNER.
CHARLES G. POLLOCK.

Witnesses:
E. F. MARTINDALE,
D. M. MAY.